US007522913B2

(12) United States Patent
Kraft

(10) Patent No.: US 7,522,913 B2
(45) Date of Patent: Apr. 21, 2009

(54) COMMUNICATION TERMINAL HANDLING USER-TO-USER INFORMATION RECEIVED DURING A CALL

(75) Inventor: Christian Kraft, Hvidovre (DK)

(73) Assignee: Nokia Corporation, Espoo (FI)

( * ) Notice: Subject to any disclaimer, the term of this patent is extended or adjusted under 35 U.S.C. 154(b) by 276 days.

(21) Appl. No.: 10/102,751

(22) Filed: Mar. 22, 2002

(65) Prior Publication Data

US 2002/0168964 A1 Nov. 14, 2002

(30) Foreign Application Priority Data

Mar. 27, 2001 (GB) ................................ 0107642.1

(51) Int. Cl.
*H04M 3/42* (2006.01)
*H04M 1/00* (2006.01)
*H04B 1/38* (2006.01)

(52) U.S. Cl. ...................... 455/415; 455/567; 455/566; 379/142.06

(58) Field of Classification Search ................ 379/67.1, 379/142, 207.15, 142.04, 179, 142.06; 455/415, 455/567, 566; *H04M 1/57*
See application file for complete search history.

(56) References Cited

U.S. PATENT DOCUMENTS 5,752,195 A 5/1998 Tsuji et al.
5,881,147 A * 3/1999 Kim ...................... 379/373.03
5,905,786 A * 5/1999 Hoopes ................. 379/142.12
5,907,604 A * 5/1999 Hsu ...................... 379/142.06
6,178,230 B1 * 1/2001 Borland ..................... 379/67.1
6,226,367 B1 * 5/2001 Smith et al. ............ 379/142.04
6,389,124 B1 * 5/2002 Schnarel et al. ........ 379/142.01
6,411,198 B1 * 6/2002 Hirai et al. ................... 340/7.6
6,418,330 B1 * 7/2002 Lee ............................ 455/567
6,434,394 B1 * 8/2002 Grundvig et al. ............ 455/463
6,442,263 B1 * 8/2002 Beaton et al. .......... 379/142.04
6,449,475 B1 * 9/2002 Chinnaswami .............. 455/415
6,463,138 B1 * 10/2002 Sherwood et al. ...... 379/142.14
6,553,222 B1 * 4/2003 Weiss ......................... 455/415
6,675,008 B1 * 1/2004 Paik et al. ................... 455/415
6,697,484 B1 * 2/2004 Fleming, III ................ 379/354

(Continued)

FOREIGN PATENT DOCUMENTS

EP 498997 B1 * 6/1997

(Continued)

OTHER PUBLICATIONS

European Search Report Nov. 26, 2001.

*Primary Examiner*—Fan Tsang
*Assistant Examiner*—Lisa Hashem
(74) *Attorney, Agent, or Firm*—Banner & Witcoff, Ltd.

(57) ABSTRACT

A communication terminal handling caller information, received from a calling communication terminal, comprises a processor controlling a phonebook database containing phone numbers and associated identification information. Upon detection of an incoming call, the processor analyses whether caller information is provided in association with said incoming call. The processor temporarily stores said caller information, if present. The processor compares said caller information with the identification information already present in the phonebook database, and the processor provides means for the user to store in a database of the communication terminal parts of the caller information not present in the database as identification information associated with the caller, the database including at least a phonebook database.

17 Claims, 7 Drawing Sheets

U.S. PATENT DOCUMENTS

| | | | | |
|---|---|---|---|---|
| 6,766,004 | B1 * | 7/2004 | Chiloyan | 379/142.15 |
| 6,788,673 | B1 * | 9/2004 | Koskinen | 370/352 |
| 6,928,306 | B2 * | 8/2005 | Matsuda et al. | 455/567 |
| 7,020,497 | B2 * | 3/2006 | Deeds | 455/567 |
| 7,050,836 | B2 * | 5/2006 | Paakkonen | 455/567 |
| 7,085,257 | B1 * | 8/2006 | Karves et al. | 370/352 |
| 7,248,900 | B2 * | 7/2007 | Deeds | 455/567 |
| 7,286,821 | B2 * | 10/2007 | Kraft et al. | 455/415 |
| 7,409,046 | B2 * | 8/2008 | Crockett et al. | 379/88.01 |
| 2002/0077102 | A1 * | 6/2002 | Achuthan et al. | 455/435 |
| 2002/0115456 | A1 * | 8/2002 | Narinen et al. | 455/466 |
| 2003/0147518 | A1 * | 8/2003 | Albal et al. | 379/207.15 |
| 2005/0129206 | A1 * | 6/2005 | Martin | 379/211.01 |
| 2006/0094404 | A1 * | 5/2006 | Burgess | 455/412.1 |
| 2006/0294465 | A1 * | 12/2006 | Ronen et al. | 715/706 |
| 2007/0004460 | A1 * | 1/2007 | Tsampalis | 455/566 |
| 2007/0064921 | A1 * | 3/2007 | Albukerk et al. | 379/373.02 |
| 2007/0189478 | A1 * | 8/2007 | Lemke | 379/142.01 |
| 2008/0144790 | A1 * | 6/2008 | Ollis et al. | 379/142.01 |

FOREIGN PATENT DOCUMENTS

| | | |
|---|---|---|
| GB | 2251764 | 7/1992 |
| WO | 98/48553 | 10/1998 |

* cited by examiner

| 8 | 7 | 6 | 5 | 4 | 3 | 2 | 1 | Octet |
|---|---|---|---|---|---|---|---|---|
| 0 | User-user<br>1 | 1 | 1 | 1 | 1 | 1 | 0<br>Information element identifier | 1 |
| Length of user-user content | | | | | | | | 2 |
| Protocol discriminator | | | | | | | | 3 |
| User information | | | | | | | | 4 etc |

User-user information element

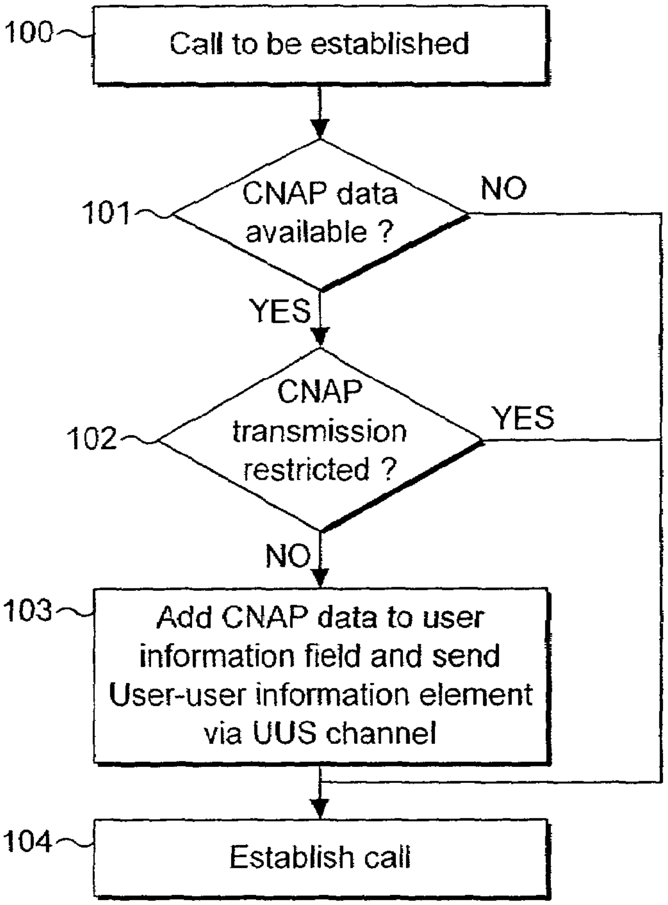

FIG. 5

<User information>::=

| | |
|---|---|
| [<name-field>] <line-feed> | ;"name" |
| [<company -field>] <line-feed> | ;"company " |
| [<title-field>] <line-feed> | ;"title" |
| [<phone number-field>] <line-feed> | ;"phone number" |
| [<fax number-field>] <line-feed> | ;"fax number" |
| [<email adress-field>] <line-feed> | ;"E-mail adress" |
| [<postal adress-field>] <line-feed> | ;"postal adress" |
| [<ringing tune-field>] <line-feed> | ;"ringing tune" |
| [<graphical type-field>] <line-feed> | ;" file type identifier" |
| [<graphical size-field>] <line-feed> | ;" file size identifier " |
| [<data-field>] <line-feed> | ;" graphical data" |

FIG. 6

| Record # | Phonenumber | Associated information |
|---|---|---|
| 1 | Phonenumber #1 | Associated information for record #1 |
| 2 | Phonenumber #2 | Associated information for record #2 |
| 3 | Phonenumber #3 | Associated information for record #3 |
| 4 | Phonenumber #4 | Associated information for record #4 |
| •••• | ••••••• | •••••••• |
| 249 | Phonenumber #249 | Associated information for record #249 |
| 250 | Phonenumber #250 | Associated information for record #250 |

| Associated information for record #N | | |
|---|---|---|
| name | Letters | 15 characters |
| company | Letters | 10 characters |
| title | Letters | 12 characters |
| further phone number | Number | 15 numbers |
| fax number | Number | 15 numbers |
| E-mail adress | Number | 20 characters |
| postal adress | Letters | 50 characters |
| ringing tune | Pointer to ringing tune register | |
| graphical data | Pointer to graphic bit -map file | |

FIG. 8

COMMUNICATION TERMINAL HANDLING USER-TO-USER INFORMATION RECEIVED DURING A CALL

BACKGROUND OF THE INVENTION

1. Field of the Invention

The invention relates to a communication terminal, e.g. a cellular or cordless phone or a communicator, handling user-to user information received during a call.

2. Description of Prior Art

GSM 02.96 version 6.0.0 Release 1997: "Digital cellular telecommunications system (Phase 2+); Name Identification Supplementary Services—Stage 1" describes how the Calling Name Presentation service works from a network point of view.

All of U.S. Pat. No. 5,752,195A, GB2,251,764A and WO98/48553A1 describe kinds of implementation schemes directed to Caller identification data or calling line identification that are used in terminals to provide the user with a name of a calling party or at least the phone number of the calling party.

SUMMARY OF THE INVENTION

According to a first aspect of the invention, there is provided a method of handling caller information received in a called communication terminal from a calling communication terminal, said called communication terminal has a processor controlling a phonebook database containing phone numbers and associated name labels, and comprising steps of analyzing whether caller information is provided in association with said incoming call, upon detecting an incoming call; temporarily storing said caller information if present; comparing said caller information with the identification information already present in the phonebook database; and storing at least parts of the caller information as identification information in said phonebook database upon request from the user. The individual user has an opportunity thereby to save information provided by the calling party for further use. This may, preferably, be done immediately after the conversion is terminated prior to switching to idle mode. The user will be offered an opportunity to save parts of the caller information not already present in the phonebook database. This opportunity will disappear after a short timeout having a duration of, e.g., 8 seconds.

According to the preferred embodiment of the invention, the processor of the called communication terminal displays one of the display notes, taken from the following prioritised order, associated with an incoming call:

1. the associated name label in the display when a calling line identification (CLI) is transferred to the called communication terminal and the associated name label is identified by means of the calling line identification (CLI);
2. a name label being part of caller information received from the calling communication terminal;
3. a phone number when a calling line identification (CLI) is transferred to the called communication terminal and the calling line identification (CLI) cannot be identified in the phonebook database thereof; or
4. an anonymous calling note when neither calling line identification nor caller information is available.

According to a further aspect of the invention, there is provided a communication terminal handling caller information received from a calling communication terminal. The called communication terminal has a processor controlling a phonebook database containing phone numbers and associated identification information. Upon detection of an incoming call, the processor analyzes whether caller information is provided in association with said incoming call. The processor temporarily stores said caller information if present. The processor compares said caller information with the identification information being present in the phonebook database; and the processor provides means for the user to store parts of the caller information as identification information in said phonebook database. Thereby, the communication terminal will handle caller ID received during the call in such a way that the user is invited to save the information in the phonebook database of the terminal. The terminal automatically analyses the data received. Shortly after the call is terminated, the user will be offered an opportunity to save the received data. Preferably, the saving only requires a single key press for confirming the saving. If the confirmation key is not activated within a timeout period of e.g. 8 seconds, the saving opportunity for saving the data with a single key press will disappear.

According to a further aspect of the invention, the received caller information includes an electronic representation of a ringing tone, and the communication terminal includes means, upon request from the user, for automatically storing the received ringing tone in a ringing tone database, and for setting of the received ringing tone as an alert signal for the associated phone number in the phonebook database.

According to a still further aspect of the invention, the received caller information includes an electronic representation of a graphical icon, and the communication terminal includes means, upon request from the user, for automatically storing the received graphical icon in a graphical icon database, and for setting the received graphical icon to be displayed upon the occurrence of an alert signal for the associated phone number in the phonebook database.

According to a still further aspect of the invention, the received caller information includes an electronic representation of a graphical animation, and the communication terminal includes means, upon request from the user, for automatically storing the received graphical animation in a animation database, and for setting the received animation to be displayed upon the occurrence of an alert signal for the associated phone number in the phonebook database.

BRIEF DESCRIPTION OF THE DRAWING

For a better understanding of the present invention and to understand how the same may be brought into effect, reference will now be made, by way of example only, to the accompanying drawings, in which:

FIG. 5 is a flow chart showing how User-to user information is transmitted from the calling user to the called user in parallel with a call set-up according to a preferred embodiment of the invention;

FIG. 6 illustrates the format of the User-to user information element transmitted via the UUS channel according to the preferred embodiment of the invention;

FIG. 8 shows the structure of a phone number database in a portable phone according to the invention.

DETAILED DESCRIPTION OF THE INVENTION

Figure 1:
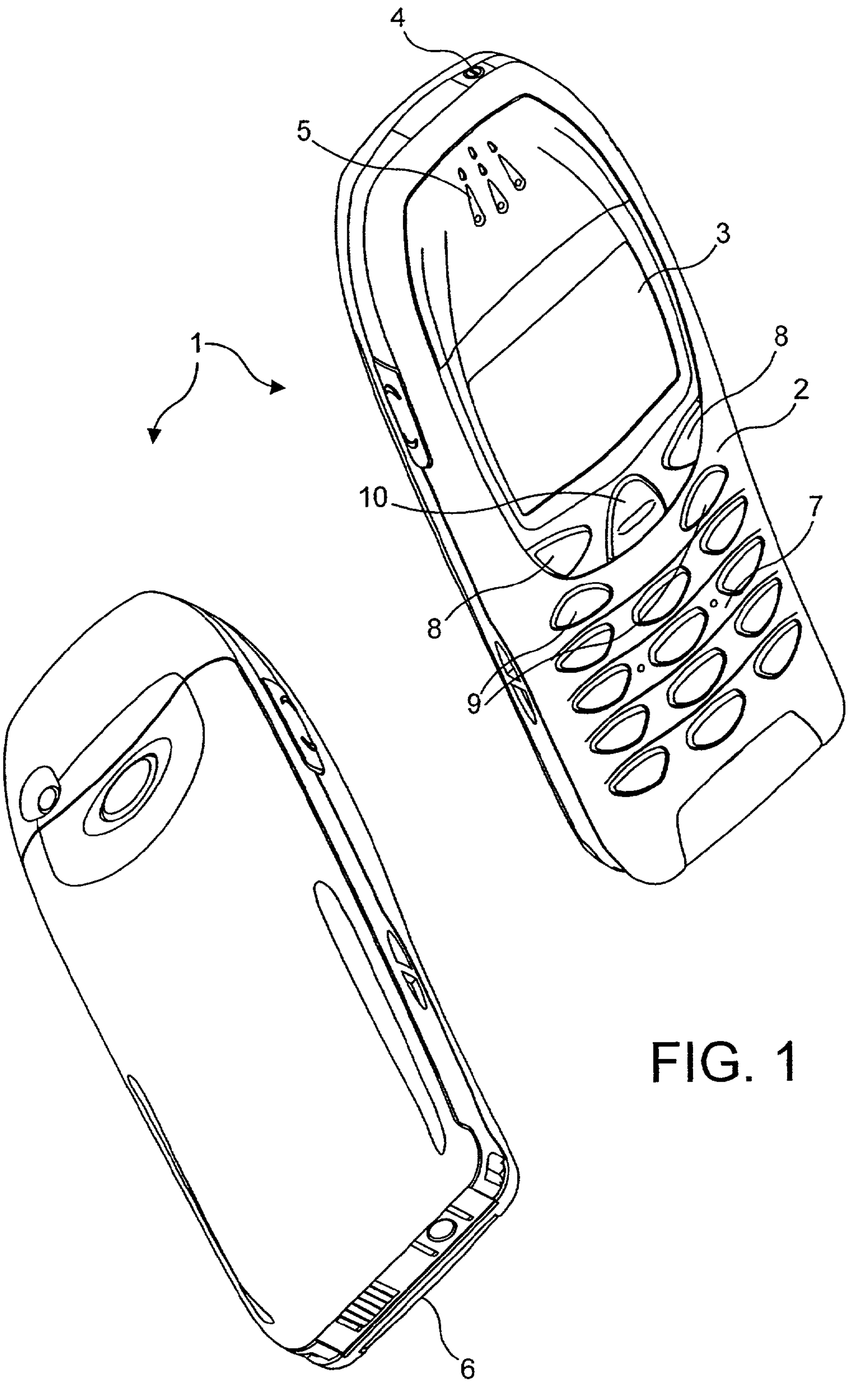
FIG. 1 schematically illustrates a preferred embodiment of a hand portable telephone according to the invention.

FIG. 1 shows a preferred embodiment of a phone according to a preferred embodiment of the invention, and it will be seen that the communication terminal is a cellular telephone, which is generally designated by 1, and comprises a user interface having a keypad 2, a display 3, an on/off button 4, a speaker 5 (only openings are shown), and a microphone 6 (only openings are shown). The telephone 1 according to the preferred embodiment is adapted for communication via a cellular network.

According to the preferred embodiment, the keypad 2 has a first group 7 of keys as alphanumeric keys, two soft keys 8, and a navigation key 10. Furthermore, the keypad includes two call-handling keys 9 for initiating and terminating calls. The present functionality of the soft keys 8 is shown in separate fields in the display 3 just above the keys 8. This key layout is characteristic of e.g. the Nokia 6210™ phone.

Figures 2, 3:
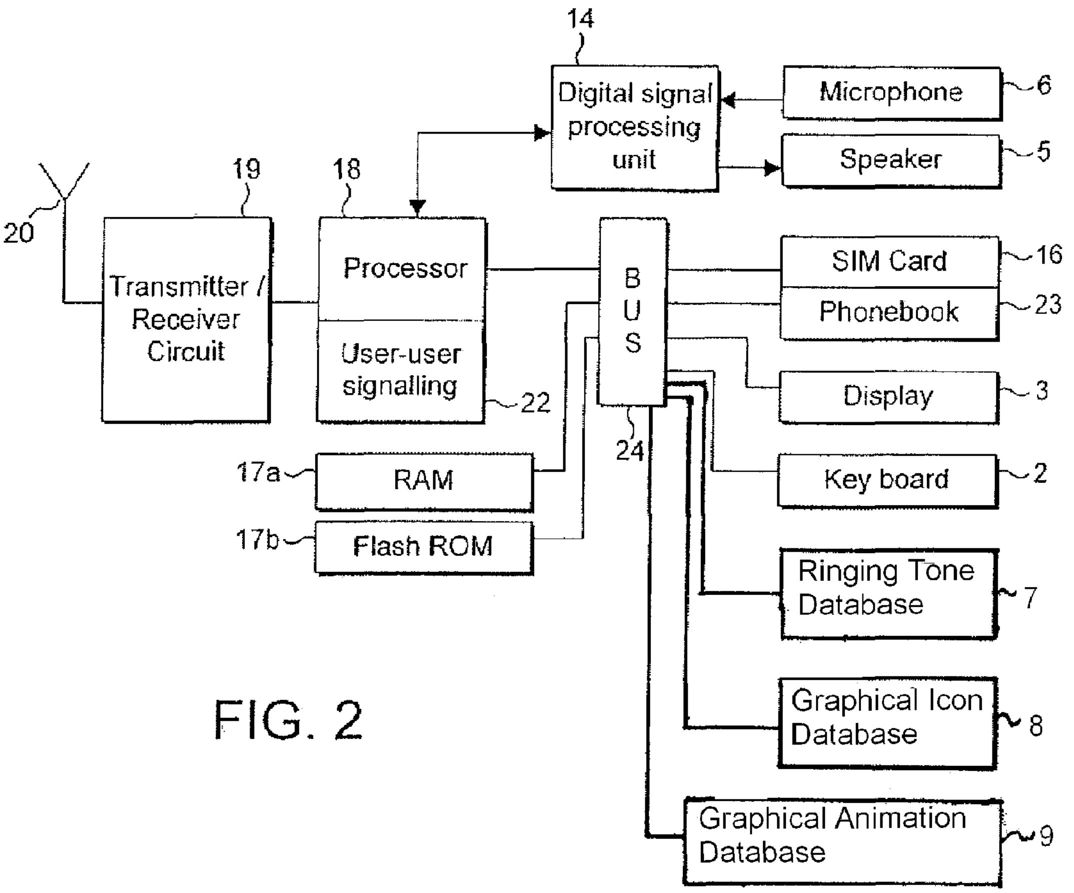
FIG. 2 schematically shows the essential parts of a telephone for communication with, e.g., a cellular network.
FIG. 3 shows an example of a User-to user information element for transferring information about the calling party for being handled according to a preferred embodiment of the invention.

FIG. 2 schematically shows the most important parts of a preferred embodiment of the phone, said parts being essential to the understanding of the invention. A processor 18, which, for example, supports the GSM terminal software, runs a program which controls the communication with the network via the transmitter/receiver circuit 19 and an antenna 20.

The microphone 6 transforms the user's speech into analogue signals; the signals formed thereby are A/D converted in an A/D converter (not shown) before the speech is encoded in an audio part 14. The encoded speech signal is transferred to the processor 18. The audio part 14 speech-decodes the signal, which is transferred from the processor 18 to the earpiece 5 via a D/A converter (not shown).

The processor 18 is connected, via a bus 24, to a RAM memory 17*a* and a Flash ROM memory 17*b*, a SIM card 16, the display 3 and the keypad 2 (as well as data, power supply, etc.). A phonebook 23, furthermore, is connected to the processor 18 via the bus 24. The phonebook 23 may be stored on the SIM card 16, and/or in the Flash ROM memory 17*a*.

In the preferred embodiment according to the invention, a User-to user signalling unit 22 is controlled by the processor 18, which performs a program, and provides User-to user signalling in a UUS channel according to GSM specification in parallel with the speech channel during e.g. call set-up.

According to the definition of the GSM 02.96 specification, the name identity comprises the name of the mobile subscriber for the purpose of calling name presentation up to 80 characters of information associated with a specific calling party. The calling name identity is the name identity of the calling party.

In addition to or instead of the name identity, the network may give a Presentation Indicator (PI) to the called mobile subscriber of the Calling Name Presentation (CNAP) service. Presentation Indicator (PI) may according to the GSM specification specify "presentation restricted", or "name unavailable".

The name identity of a GSM Public Land Mobile Network (PLMN) subscriber shall always be provided by the network. The Calling Name Presentation service is provided to the called party.

The calling name information of the calling party includes either the calling name identity or an indication of privacy or unavailability.

The Calling Name Presentation supplementary service enables the called party to receive the calling name information of the calling party. This supplementary service provides for the ability to indicate the name information of the calling party to the called party at call set-up time for all incoming calls.

The calling party takes no action to activate, initiate, or in any manner provide Calling Name Identification Presentation. However, the delivery of the calling mane to the called party may be affected by other services subscribed to by the calling party. For example, if the calling party has subscribed to Calling Line Identification Restriction (CLIR), then the calling line identity as well as the calling name identity shall not be presented to the called party.

The applicability of this supplementary service is defined in GSM 02.04. Calling Name Presentation is applicable to all telecommunication services except Short Message service.

This supplementary service is provisioned for all Basic Services subscribed to and to which it is applicable.

This service shall be provided after pre-arrangement with the service provider. It may be provided on a subscription basis or be generally available. The override category controlling the name information is separate from the override category for the line identity information. It is left to the Calling Name Presentation service provider to ensure that no discrepancy between these two override categories occurs. The handling of override category within a Public Land Mobile Network or between Public Land Mobile Networks shall follow the rules applying to the override category of the line identification services.

The Calling Name Presentation supplementary service shall be withdrawn at the customer's request or for administrative reasons.

The network shall automatically invoke the Calling Name Presentation supplementary service in the call set-up phase to the terminating Calling Name Presentation subscriber. Calling Name Presentation is invoked when the Calling Name Information associated with an incoming call is available and can be presented to the called party, which has subscribed to Calling Name Presentation.

A user who has subscribed to the Calling Name Presentation supplementary service and receives a call shall also receive the calling name information of the calling party, if available. The calling party takes no action to activate, initiate, or in any manner provide the calling name identity. When the Calling Name Presentation service is subscribed and activated, the destination network provides the called subscriber with calling name information at call set-up on all incoming calls or during an active call for that particular call. In addition to, or instead of, the calling name identity, the subscriber may be given a presentation indicator with the relevant information.

The mobile subscriber can, by the appropriate control procedure, request from the network the status of this supplementary service. Upon receiving an interrogation request, the network shall send the status of this supplementary service to the subscriber. The information sent to the subscriber shall indicate whether the service is provided to them. The information sent in response to the interrogation of this supplementary service should not imply the status of any other supplementary service.

If the name identity for a specific caller is not available, then the Calling Name Presentation subscriber shall be sent an indication that the name is unavailable. If the network has been unable to determine the appropriate name information within a predefined time, then the Calling Name Presentation subscriber shall be sent an indication that the name is unavailable. The predefined time is a network dependent value such that the called user may receive the name in a timely manner prior to answer.

If the calling name information is not available due to a system problem, such as signalling inter-working, then a standard error treatment shall be provided, which may be a visual display to the subscriber indicating the name is unavailable.

The decision of whether the user-defined name stored in the handset should take precedence over the calling name identity provided by the network is a handset implementation issue.

The Calling Line Identification Restriction supplementary service shall take precedence over the Calling Name Presentation supplementary service, unless the called user has an override category. In this latter case, it is assumed that the override category for name information has been set so that the name information is presented to the called user. The Calling Line Identification Restriction information shall be used to restrict the delivery of the calling name to the called subscriber. That is, if the calling party has activated Calling Line Identification Restriction then instead of the calling name, a privacy indication shall be provided to the called subscriber, which may be a visual display indicating “private” (or Restricted) name. This method of restricting calling name shall not restrict the use or implementation of other calling name restriction methods when the calling party is a fixed subscriber. These methods used by fixed subscribers are outside the scope of this specification.

For an incoming call to a subscriber with both Calling Name Presentation and Call Forwarding Unconditional activated, the calling party name information shall not be displayed at the forwarding subscriber’s terminal. When a call has been forwarded and the forwarded-to user has been provided with the Calling Name Presentation supplementary service, the forwarded-to user shall receive the name of the original calling party, if the calling party has not subscribed to or invoked the Calling Line Identification Restriction supplementary service.

For an incoming call to a subscriber with both Calling Name Presentation and Call Forwarding on No Reply activated, the calling party name information shall be displayed by the predefined time while the call is alerting.

If the served mobile subscriber is provisioned with the Calling Name Presentation service, the calling party name information shall be displayed to the subscriber at the notification of an incoming (waiting) call as for a normal incoming call.

Calling Name Presentation should be available to a roaming subscriber. However, the serving system may elect to not offer the Calling Name Presentation service to any subscriber.

According to the definition of the GSM 02.87 specification, the User-to-User Signalling (UUS) supplementary service allows the served subscriber to send/receive a limited amount of subscriber generated information to/from another user in association with a call to the user. This information shall be passed transparently (i.e. without modification of contents) through the network. Normally, the network shall not interpret or act upon this information.

The served subscriber can send and receive User-to-User-Information (UUI) in different phases of the call depending on the service(s) to which the subscriber subscribes.

With these services, according to the GSM specification, the User-to-User-Information can be sent and received during the origination and termination of a call, with User-to-User-Information embedded within call control messages. The service can be activated implicitly by inserting User-to-User-Information when a call is set-up or explicitly with an appropriate procedure.

Alternatively, the User-to-User-Information can be sent and received after the served subscriber has received an indication that the remote party is being informed of the call and prior to the establishment of the connection. User-to-User-Information sent by the served subscriber prior to receiving the acceptance of the call by the remote party may, as a network option, be delivered to the remote party after the call has been established.

Finally, the User-to-User-Information can be sent and received only while the connection is established.

Preferably, the User-to-User-Information service shall allow the transmission of User-to-User-Information with the maximum length of 128 octets per message.

The User-to-User Signalling supplementary service can be delivered only when both subscribers are GSM PLMN/ISDN subscribers or when a non-ISDN network provides a means of conveying the User-to-User-Information.

Some networks may support the transmission of User-to-User-Information with a maximum length of only 32 octets per message for service 1. In the interworking case, only the first 32 octets of User-to-User-Information with more than 32 octets per message shall be transferred. No notification about the limitation of the User-to-User-Information shall be given to any subscriber.

GSM networks may support the User-to-User Signalling service implicitly requested with 32 octets.

The network option to allow forwarding of User-to-User Signalling requests and User-to-User-Information only if the forwarding subscriber has the subscription of the relevant User-to-User Signalling service is not supported. The general principle of Completion of Calls to Busy Subscriber supplementary service to retain all information of the original call set-up and reusing this information for the Completion of Calls to Busy Subscriber supplementary service call shall also be valid for the User-to-User Signalling supplementary service. Therefore, the User-to-User-Information contained in the original call set-up shall be stored in the network and reused in the Completion of Calls to Busy Subscriber supplementary service call.

The formal definition of the component types to encode these operations and errors is provided in the UUS supplementary service specification.

The message structure for the messages used in the UUS supplementary service. The general definition of the message structure and the key to the interpretation can be found in ETSI EN 300 403-1.

A User-to user information element is to convey information between the users. This information is not interpreted by the network, but is carried transparently and delivered to the receiving user. This information may be called a User-to user information element as shown in FIG. 3. Byte 8 in the first octet of the User-to user information element is a 0, and the remaining 7 bytes are used as an identifier of the information element. The second octet defines the length of User-to user contents. The third octet includes a protocol discriminator that specifies the protocol of the message being transferred, while the fourth and further octets defines a user information field including the user information sent.

There are no restrictions on the contents of the user information field. In addition to the user information message, the User-to user information element can be included in the set-up, alerting, connect, disconnect, progress, release and release complete message.

Figure 4:
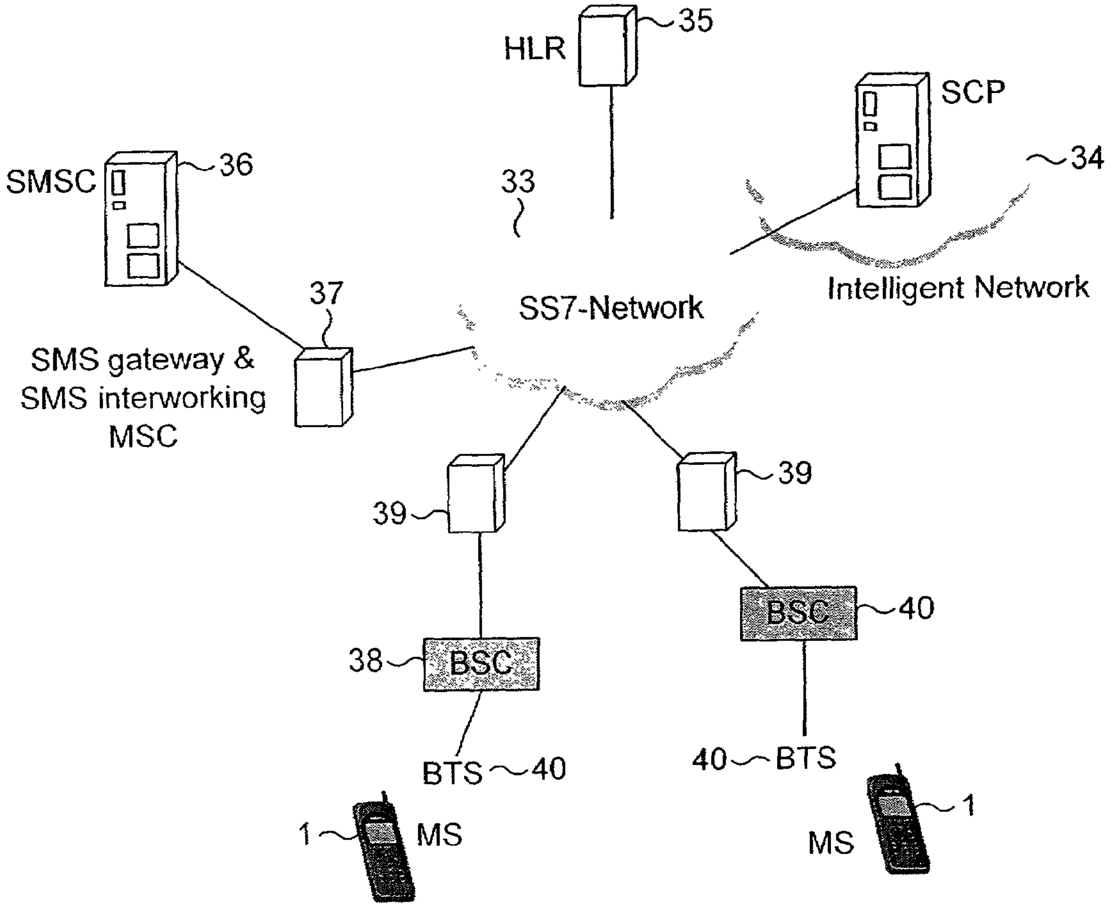
FIG. 4 shows the basic elements of a network by means of which the invention may be carried out.

According to a preferred embodiment of the invention, handling of user information transfer will be explained with reference to FIG. 4.

As SS7 Network 33 is a CCITT specified network interconnecting the individual parts of the system, and this SS7 Network 33 is connected to a Service Control Point 34 (SCP) in a so-called Intelligent Network (IN) containing billing information for cellular phones, and is connected to a Home Location Register 35 (HLR) containing a database including relevant subscriber information for the provision of the telecommunication service, and a SMS gateway & SMS interworking Mobile Switching Center (MSC) 37 for routing a message towards a Mobile Station (the phone 1). A Short Message Service Center 36 (SMSC) and an SMS gateway & SMS interworking Mobile Switching Center (MSC) 37 which handles and routes the SMS's between the SMSC 36 and the SS7 Network 33.

From the SS7 Network 33, the call (in parallel with the UUS channel) is routed towards the Mobile Station 1 via a Mobile Switching Center (MSC) 39, and a Base Station Processor 38 (BSC). A Base Transceiver Station (BTS) 40 establishes the air connection towards the Mobile Station 1.

During call establishment the calling telephone 1 runs through the steps of FIG. 5. When the telephone has to establish a call at step 100, it investigates in step 101 whether Calling Name Presentation is available and in step 102 whether Calling Name Presentation transmission is restricted. If the Calling name Presentation is available and not restricted, Calling Name Presentation is transmitted to the called telephone via the UUS channel in step 103, and the remote telephone is called at step 104.

An example of the format of the User-to-user information element is shown in FIG. 6. In the beginning of the element, there is an identifier for the element so the called phone is able to recognise the element as a User-to-user information element. The User-to-user information element may contain a plurality of sub-elements all comprising a sub-element identifier, a data part and a separator element (line-feed). Each of the sub-elements may include a plurality of data parts, and these data parts are separated by a separator element (line-feed).

The sub-elements may include name, company, title, fax number, E-mail address, postal address, a ringing tune, a file type identifier, a file size identifier, and graphical data.

The ringing tune format may be the per se known ringing tune format available from the Nokia Smart Messaging concept while the file type identifier identifies the type of the graphics, e.g. a Wireless Bitmap (WBMP) format, GIF animated, still images compressed or a combination thereof. When the graphic file is an animated GIF file, the number of images in the animation will be a part of this information. The file size may be 32×60 pixels, with one bit per pixel (black and white) or with gray scales or color information. Finally, the graphical data contains the relevant data to be interpreted based on the file type identifier and the file size identifier.

Figure 7:
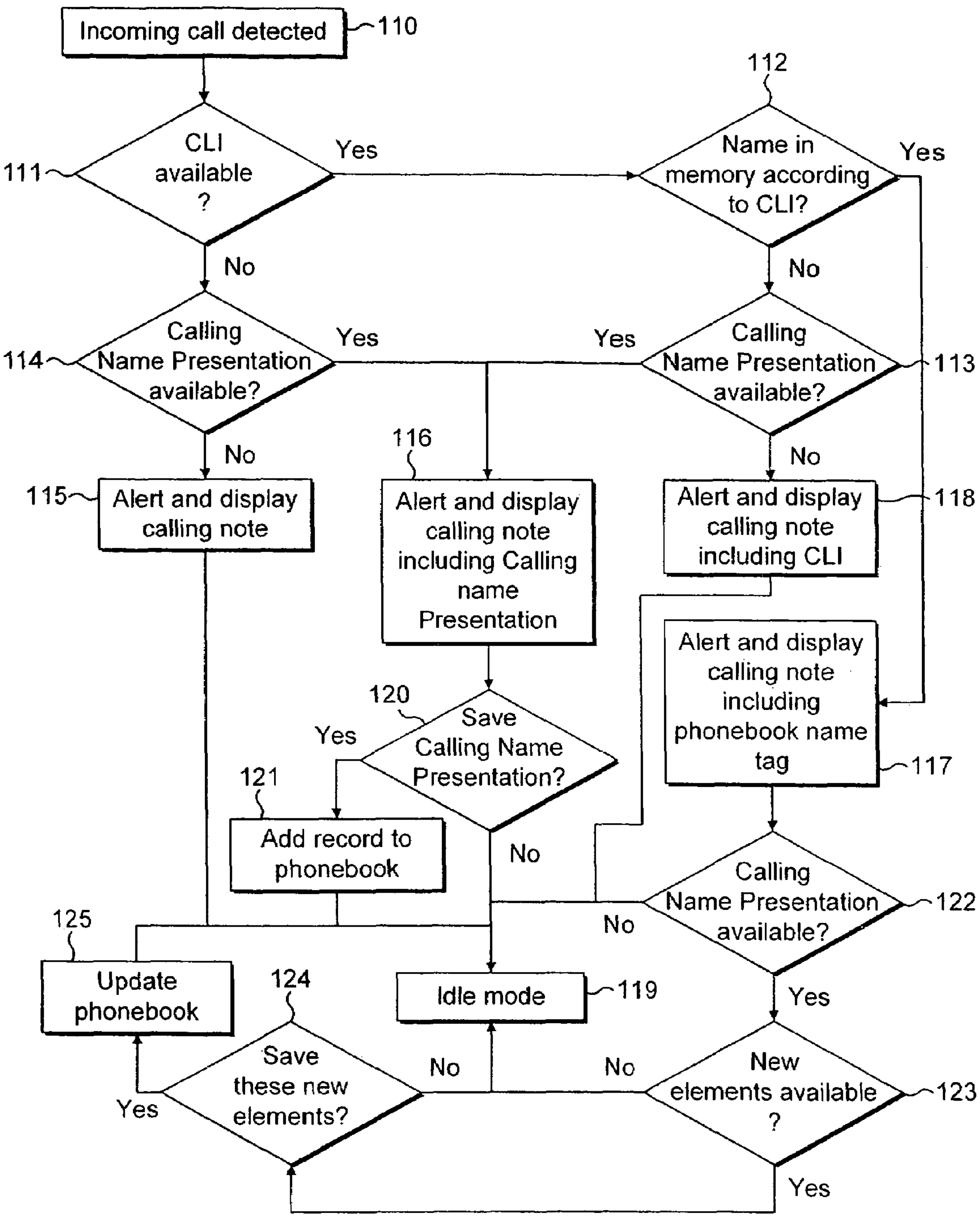
FIG. 7 is a flow chart showing how to handle User-to user information according to the invention during call set-up, during the call and after call termination.

When an incoming call is detected at step 110 in FIG. 7, the telephone starts to check at step 111 whether CLI information is available. If the CLI information is available, the processor compares the CLI information (the phone number) with the information available in the phonebook memory in step 112. If the phone number already exists, the associated name label or name tag is displayed in step 117 as calling note during the alert of the telephone.

During the call the processor checks in step 122 whether Calling Name Presentation (User-to user information element) is available and, if this is the case, the processor evaluates in step 123 whether the User-to user information element includes sub-elements that are different from what is stored in the phonebook database in the called telephone. If no difference or new sub-elements are found, the phone returns to idle mode (step 119) upon termination of the call.

If the processor checks in step 122 deems the Calling Name Presentation (User-to user information element) is not to be available, the telephone returns to idle mode 119.

If at least one of the sub-elements in step 123 is new or different from what is stored in the phonebook database, the processor provides a possibility for the user to update the phonebook of the telephone by selecting (in step 124) one or more of the sub-elements for entering them into the phonebook in step 125. If the user does not want to save the sub-element or let the time out run out, the telephone returns to idle mode 119.

When the CLI information is available from the network, but the processor can not identify the phone number in the phonebook memory in step 112, the processor tries to detect whether the Calling Name Presentation (User-to user information element) is available in step 113. If the Calling Name Presentation is not available, the telephone shows the CLI information (calling phone number) in step 118 as calling note during the alert of the telephone. Upon termination of the call, the telephone returns to idle mode 119.

If the Calling Name Presentation is available in step 113, the telephone shows the Calling Name Presentation information in step 116 as calling note during the alert of the telephone. The calling note may during the alert be a toggling between the name label information and the graphical information if present. Otherwise, only the name label information is shown. The alert signal will be the ringing tune received, or the default ringing tune of the telephone if the Calling Name Presentation did not include a ringing tune.

When the call is terminated, the processor provides a possibility for the user to update the phonebook of the telephone by selecting (in step 120) one or more of the sub-elements for entering them into the phonebook in step 121, and then return to idle mode 119. If the user does not want to save the sub-item or let the time out run out, the telephone returns to idle mode 119.

If the telephone in step 111 was not able to identify CLI information, the processor tries to detect whether the Calling Name Presentation (User-to user information element) is available in step 114. If the Calling Name Presentation is not available, the telephone shows an anonymous calling note in step 115 during the alert of the telephone. Upon termination of the call, the telephone returns to idle mode 119. If the Calling Name Presentation is available in step 114, the telephone shows the Calling Name Presentation information in step 116, as described above.

FIG. 8 shows basically two tables. The first one shows that the phonebook memory (phone number database) includes e.g. 250 records each containing a phone number and associated information. The second table shows that each record may include sub-elements such as name, title and company of the person owning the phone number. Furthermore, further phone numbers, fax numbers, E-mail addresses and postal address may be included.

Finally, the Calling Name Presentation information may include a ringing tune and a graphical element. These data will not be stored in the phonebook memory. Instead the data will advantageously be stored in a ringing tune register, and in a special memory part dedicated for graphical elements. Then the phonebook memory record will include a pointer to the relevant memory parts. Hereby the ringing tune may be dedicated to more than the person from where whom tune is received. The same applies for the graphical element.

If there is no empty space for the sub-elements to be stored, the user may be requested to identify an existing amount of data in the memory to be over-written.

Figure 9:
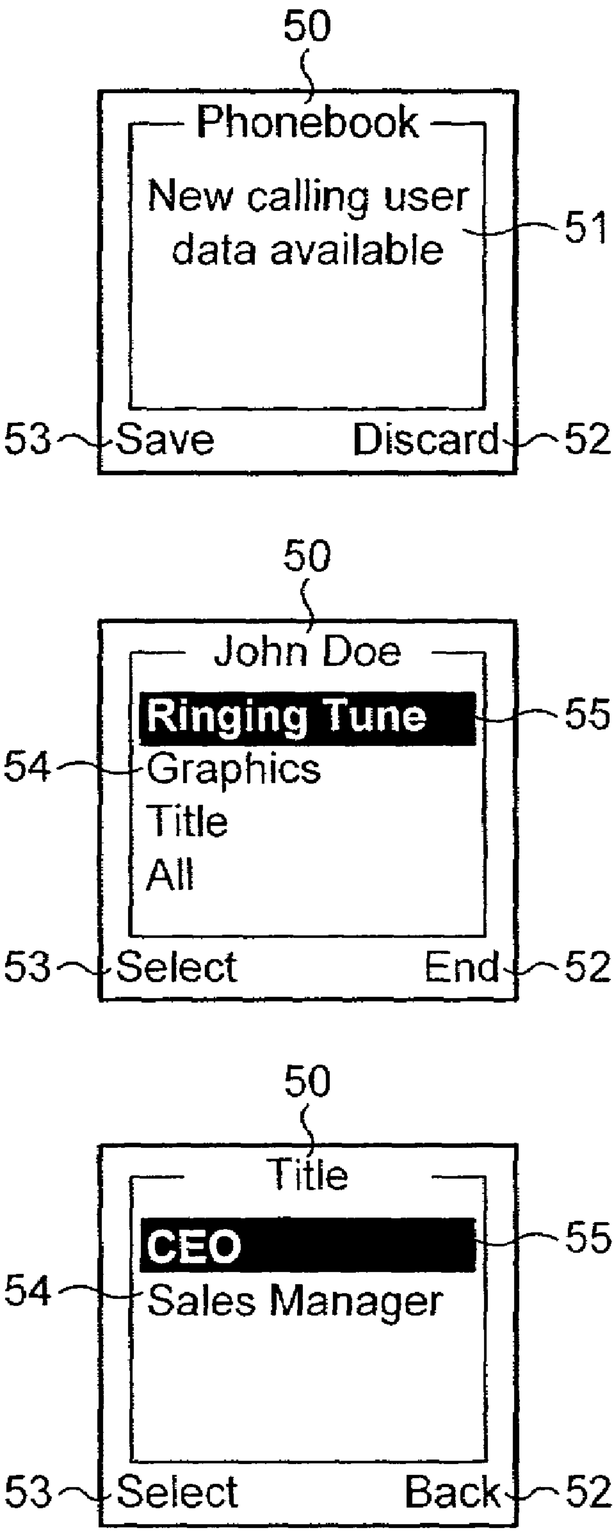
FIG. 9 is an illustration of a display of a phone according to an aspect of the invention.

FIG. 9 shows a situation where the processor has detected sub-elements from Calling Name Presentation information that are not present in the phone number memory. The situation occurs at step 120 and step 124 in FIG. 7. During the call the data will be temporarily stored in the RAM memory 17*a* (see FIG. 2). When the call is terminated, the first display of FIG. 9 is shown on the telephone display.

A header 50 indicates that the telephone has switched to phonebook mode. In a main part 51 of the display, the user is notified about that "New calling user data is available". If the user presses the right soft key 8, having the soft key label "discard" 52, or does not press any keys for example, for 8 seconds, the telephone will automatically return to idle mode. If the user presses the left soft key 8 having the soft key label "save" 53, the second display of FIG. 9 pops-up.

Here the header 50 shows the name label "John Doe" target for the operation. The name label is coming from the phonebook database 23 or from the received Calling Name Presentation information. If no phonebook record is present on the received phone number, a record of the associated information may be created by the telephone user based on the received Calling Name Presentation information. The name is provided from the received Calling Name Presentation information and shown as the header 50. The user may pick the information individually from a list 54 of sub-elements by moving a high-lighting bar 55 by means of the scroll key 10, or select all sub-elements by moving the high-lighting bar to "All" in said list. The selection is done by pressing the left soft key 8 having the soft key label "select" 52 (see FIG. 1).

When the record already exits in the phonebook and only some of the sub-elements are new, or differs from what is present in the record, the process is basically the same. The phone stores the sub-elements in the record one by one, and if the processor detects something ambiguous the third display of FIG. 9 will be displayed. In the example shown, the original record included one title and the received Calling Name Presentation information includes a new title. When selecting the title item from the second display, the user has to choose what title to use. The newest data from the received Calling Name Presentation information is suggested as default. These choices have to be done every time the choice is non-evident.

When saving a ringing tune or graphics, it might be necessary to overwrite existing data. Also here the user has to make a choice.

When there is no correlation between the phone numbers derived from the received Calling Name Presentation information and from the CLI, the user has to make a similar choice.

The invention relates to Calling Name Presentation (CNAP), which basically allows a mobile phone during an incoming call to receive the name, phone number as further information to identify the calling party. According to the invention, all this information or a part thereof may be saved when the call has been terminated. In this way, the user would be able to "auto-generate" a complete phonebook.

The network may provide data information about the Calling Party in addition to normal Calling Line Identification (CLI) information. This information is provided to the Called Party. This information may, during a call, be used for identifying the Calling Party to the Called Party.

If the network provides Calling Name Presentation information about the Calling Party to the Called Party in addition to CLI information, this information may be displayed during call set-up and during a call. This will happen, also, if the phone cannot find the name in the phonebook database associated with the CLI information the network has provided.

According to the preferred embodiment of the invention, the telephone will prioritise the display of information as follows:

Name in memory according to CLI (phone number).
Calling Name Presentation.
CLI.
Anonymous calling note.

If the network indicates that Calling Name Presentation information is not available, the phone may display an information note "Caller ID Not Available From Network".

According to a further embodiment of the invention, the user has a possibility to switch an auto-save functionality on/off. When the auto-save functionality is off, the saving of CNAP information works as described above. When the auto-save functionality is on, the processor automatically up-dates in step 123, in FIG. 7, the existing records with the received CNAP information without asking the user for acknowledgement.

The user may, according to this further embodiment, have an opportunity to reject the reception of CNAP information, whereby the processor discards the received data and an opportunity to save everything received as CNAP information. However, this means that the terminal should be able to store huge amounts of data.

What is claimed is:

1. A method comprising:

receiving caller information at a called communication terminal in association with an incoming call;

the called communication terminal comparing a first portion of the caller information with identification information in a database;

in response to finding a match between the first portion and the identification information in the database, comparing a second portion of the caller information with identification information in the database;

alerting a user of the called communication terminal when the second portion of the caller information contains new information, corresponding to the matching first portion of the caller information, that is not present in the database as corresponding to the matching first portion of caller information in the database, wherein the alerting includes a user-selectable display of information items from the second portion;

receiving a user response to the alert authorizing a change to the database, wherein the response includes a user selection of one or more of the displayed information items; and updating the database in response to the user response.

2. The method of claim 1, wherein the called communication terminal displays caller information, prioritized as follows:

(i) a name in the database associated with the first portion of the caller information;

(ii) a name in the first portion of the caller information received from the calling communication terminal;

(iii) a phone number in the database associated with the first portion of the caller information; or (iv) an anonymous calling note when identification information is not present in the database and caller information is not available.

3. A method according to claim 1, wherein one or more parts of the received caller information is provided as Calling Name Presentation to the terminal during a call set-up for an incoming call, and the updating is performed immediately after incoming call termination.

4. A method according to claim 1, wherein the one or more new parts of the caller information are selectively updated simultaneously.

5. A method according to claim 1, wherein the one or more new parts of the caller information are selectively updated one at a time.

6. The method of claim 1, wherein the new information includes an electronic representation of a ringing tone, and the updating the database further comprises:

setting the electronic representation of the ringing tone as an alert signal associated with a user identified by the first portion of the caller information.

7. An apparatus comprising:

one or more computer-readable media, storing:

a phonebook database configured to store caller information comprising identification information including one or more parts from the group of: phone number; name-label; company; title; fax number, e-mail address; postal address; file type identifier; file size identifier; and graphical data;

a ringing tune database configured to store caller information comprising one or more electronic representations of ringing tunes associated with one or more entries in the phonebook database; and a processor, configured to:

receive caller information provided in association with an incoming call;

compare a first portion of the caller information with the phonebook database to identify database information for a caller corresponding to the first portion;

in response to the phonebook database having information matching the first portion, compare a second portion of the caller information with the phonebook database and the ringing tune database, and alert a user of the apparatus when the caller information contains one or more new parts;

display the one or more new parts of caller information to the user and receive a user selection of one or more of the new parts; and update the phonebook database or ringing tune database with the one or more selected new parts, wherein the processor is configured to enable the user to set a received electronic representation of a ringing tone as an alert signal for an associated phone number in the phonebook database.

8. An apparatus according to claim 7, wherein the received caller information includes an electronic representation of a graphical icon, and wherein the apparatus further comprises a user interface configured to enable the user to automatically store the received electronic representation of a graphical icon in a database, and to set the received electronic representation of a graphical icon to be displayed upon occurrence of an alert signal for an associated phone number in the phonebook database.

9. An apparatus according to claim 7, wherein the received caller information includes an electronic representation of a graphical animation, and wherein the apparatus further comprises a user interface configured to enable the user to request that the apparatus automatically store the received electronic representation of a graphical animation in an animation database, and to set the received graphical animation to be displayed upon occurrence of an alert signal for an associated phone number in the phonebook database.

10. An apparatus according to claim 7, wherein the received caller information is provided as Calling Name Presentation to the apparatus during a call set-up for an incoming call, and the updating is performed immediately after incoming call termination.

11. An apparatus according to claim 7, wherein one or more parts of the received caller information is provided as Calling Name Presentation to the apparatus during a set-up for an incoming call, and the updating is performed immediately after incoming call termination.

12. An apparatus according to claim 7, wherein the processor is configured to selective update new parts of the caller information simultaneously.

13. An apparatus according to claim 7, wherein the processor is configured to selectively store new parts of the caller information one at a time.

14. A computer-readable medium storing computer-executable instructions for performing:

in a called communication terminal, receiving caller information from a calling communication terminal;

comparing a first portion of the caller information with identification information in a database;

in response to finding a match between the first portion and the identification information in the database, comparing a second portion of the caller information with identification information in the database;

alerting a user of the called communication terminal when the second portion of the caller information contains information, corresponding to the matching first portion of the caller information, that is not present in the phonebook database as corresponding to the matching first portion of caller information in the database, wherein the alerting includes a user-selectable display of information items from the second portion;

receiving a user response to the alert authorizing a change to the database, wherein the response includes a user selection of one or more of the displayed information items; and updating the database in response to the user response.

15. The computer-readable medium of claim 14, wherein the new information includes an electronic representation of a ringing tone, and the instructions for updating the database further comprise instructions for setting the electronic representation of the ringing tone as an alert signal associated with a user identified by the first portion of the caller information.

16. The computer-readable medium of claim 14, wherein the caller information includes both a phone number and a name.

17. The computer-readable medium of claim 16, further comprising computer-executable instructions to attempt to look up the name label from the database, using the phone number, and displaying that name label if found, and if no name label is found in the database, to then display the name from the caller information.

* * * * *